June 14, 1932.    A. GIMONET    1,863,106

LIP STICK HOLDER

Filed June 17, 1929

Alexandre Gimonet,
Victor J. Evans

Patented June 14, 1932

1,863,106

UNITED STATES PATENT OFFICE

ALEXANDRE GIMONET, OF ARROCHAR, STATEN ISLAND, NEW YORK

LIP STICK HOLDER

Application filed June 17, 1929. Serial No. 371,617.

This invention relates to cosmetic holders and has for an object the provision of what may be termed a permanently pointed lip stick, in that a pointed container is utilized to hold lip cream so that the latter may be properly and readily applied to the lips.

Another object of the invention is the provision of a holder or container which may be used for various kinds of cosmetics, such as lip and other rouge, liquid powder, liquid eyelash cream, perfume, shaving cream, tooth paste and various other creams and cosmetics, so that the latter may be kept in proper and convenient condition for use.

Another object of the invention is the provision of a container having novel means for ejecting its contents, so that the quantity ejected may be accurately regulated.

With the above and other objects in view, the invention further includes the following novel features and details of construction, to be hereinafter more fully described, illustrated in the accompanying drawing and pointed out in the appended claims.

In the drawing:—

Figure 1:
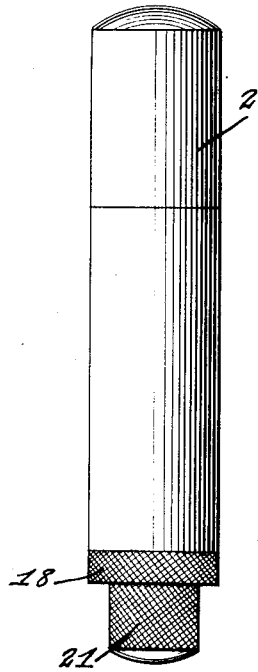
Figure 1 is an elevation of the invention.
Figure 2:
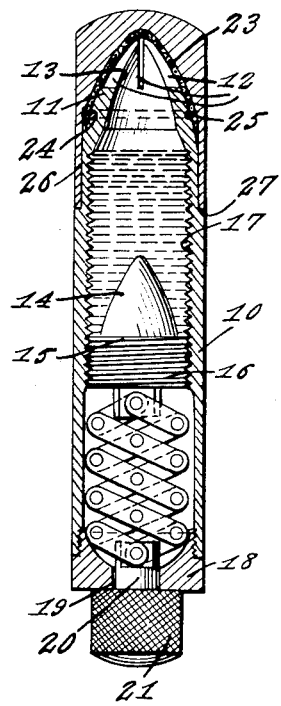
Figure 2 is a central longitudinal sectional view.
Figure 3:
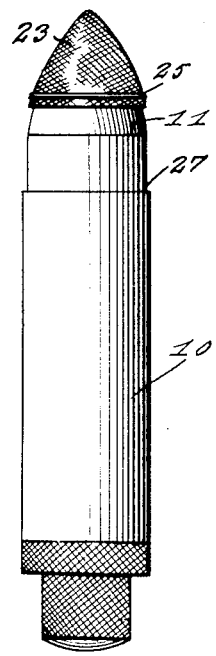
Figure 3 is an elevation with the cap removed.

Referring to the drawing in detail wherein like characters of reference denote corresponding parts, the invention as shown comprises a tubular container 10 which is pointed at one end as indicated at 11. This pointed end is provided with a restricted opening which, in the present instance is shown as formed of crossed slits 12.

The container 10 provides a holder for pastes or creams and the interior of the holder has its pointed end tapered upon the inside as shown at 13 to receive the pointed end 14 of a compression member 15. This compression member is provided with an exteriorly threaded portion 16 which engages threads 17 provided upon the inner wall of the container.

The end of the container remote from the pointed end 11 is closed by a removable plug 18 and this plug is provided with an opening 19 which rotatably receives the shank 20 of an operating member or button 21. The shank 20 is connected with the compression member by means of toggle links 22.

It will be apparent from the foregoing description and accompanying drawing that when the operating member or button 21 is rotated, the compression member 15 will be likewise rotated. When rotated in one direction, the compression member will travel toward the discharge end of the container so as to force outward through the discharge opening 12 a portion of the contents of the container. By reason of the mounting and operation of the compression member 15, the amount discharged from the container may be accurately regulated.

The container may be used for creams of semi-liquid pastes of various consistencies and these pastes or creams are forced outward through the discharge opening 12 and through a fabric or other porous cover 23 which is removably placed over the discharge end of the container. In order to hold the cover 23 in place the end of the container is circumferentially grooved as shown at 24 and an elastic or other binder 25 is placed around the cover so as to force the latter into the groove and securely hold the same in place. If desired, the cover may be smoothly arranged upon the end of the container and held temporarily in position by a binding of silk thread until the elastic binder is arranged in place. When a relatively stiff cream or paste is used, the cover 23 will be thinner or of greater porosity than a cover for a thin or semi-liquid paste.

The container is provided with a removable cap 26 which is shaped to receive the pointed end of the container and which is adapted to frictionally engage the cover 23 so as to prevent accidental loss of the cap. The container is provided with an annular shoulder 27 against which the inner end of the cap is seated.

Figure 5:
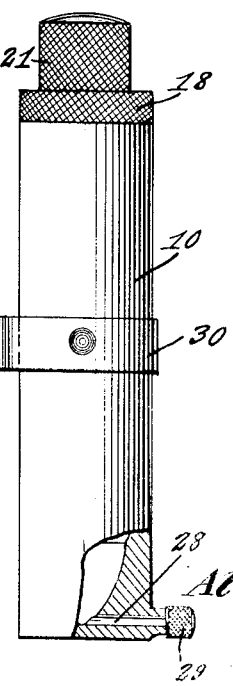
Figure 5 is an elevation partly broken away showing a slightly modified form of the invention.
Figure 4:
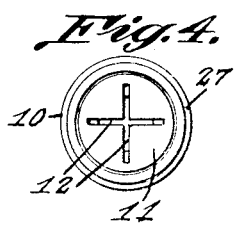
Figure 4 is an end view.

In Figure 5 of the drawing, the invention is arranged especially for dispensing tooth paste, shaving and other creams. For this purpose, the pointed end is dispensed with and a laterally extending discharge passage 28 is provided. This passage is closed at its outer end by a removable cap 29. If desired, the container may be supported by a suitable bracket 30. In other respects the construction and operation of the invention is similar to that previously described.

The invention is susceptible of various changes in its form, proportions and minor details of construction and the right is herein reserved to make such changes as properly fall within the scope of the appended claims.

Having described the invention what is claimed is:—

1. In a container, a tubular member having a pointed end and having elongated slots thereacross to provide a restricted outlet at said end, a compression member threadedly engaging the inner wall of the tubular member and having a portion shaped in conformity with the shape of the interior of the tapered end to force the contents of the tubular member through said slots, a porous cover for said slots, a rotatable operating member, and means connecting the operating member and compression member to rotate the latter and move said compression member longitudinally of the tubular member when the operating member is rotated.

2. In a container, a tubular member having a pointed end provided with a restricted discharge outlet and a circumferential groove, a compression member movable therein, an operating member, means connecting the operating member with the compression member to move the latter and discharge the contents of the container through the restricted discharge outlet of the pointed end of the tubular member, a porous cover fitting over the pointed end of the tubular member and covering the discharge outlet thereof, and a binder seated within the circumferential groove of the pointed end for detachably securing the porous cover in position.

In testimony whereof I affix my signature.

ALEXANDRE GIMONET.